United States Patent
Kawamoto (10) Patent No.: US 9,691,265 B2
(45) Date of Patent: Jun. 27, 2017

(54) SOUNDNESS CHECKING FIELD DEVICE

(71) Applicant: YOKOGAWA ELECTRIC CORPORATION, Musashino-shi, Tokyo (JP)

(72) Inventor: Takuya Kawamoto, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 14/750,176

(22) Filed: Jun. 25, 2015

(65) Prior Publication Data

US 2015/0379865 A1    Dec. 31, 2015

(30) Foreign Application Priority Data

Jun. 26, 2014    (JP) .................................. 2014-131593
Mar. 16, 2015    (JP) .................................. 2015-051925

(51) Int. Cl.
   *G08B 29/00*    (2006.01)
   *G08B 29/12*    (2006.01)
   *G05B 19/042*   (2006.01)

(52) U.S. Cl.
   CPC ......... *G08B 29/12* (2013.01); *G05B 19/0428* (2013.01); *G05B 2219/24054* (2013.01); *G05B 2219/24063* (2013.01); *G05B 2219/25107* (2013.01); *G05B 2219/25428* (2013.01); *G05B 2219/34477* (2013.01)

(58) Field of Classification Search
   CPC ...... G05B 19/0428; G05B 2219/24054; G05B 2219/24063; G05B 2219/25428; H02P 23/0077; G08B 29/12

USPC ......... 340/516; 318/565, 567, 569; 702/183; 715/771; 388/909

See application file for complete search history.

(56) References Cited

U.S. PATENT DOCUMENTS

| | | | |
|---|---|---|---|
| 6,555,984 B1 | 4/2003 | Rajala et al. | |
| 7,460,918 B2* | 12/2008 | Giraud .............. | G05B 19/0426 700/87 |
| 7,602,132 B2* | 10/2009 | Davis ................. | H02P 23/0077 318/565 |
| 9,264,973 B2* | 2/2016 | Shepard .............. | H04W 40/24 |
| 2006/0289400 A1 | 12/2006 | Takahashi | |
| 2007/0193334 A1 | 8/2007 | Hays | |
| 2008/0078252 A1 | 4/2008 | Graber et al. | |

(Continued)

FOREIGN PATENT DOCUMENTS

| | | |
|---|---|---|
| DE | 102011075764 A1 | 11/2012 |
| EP | 1369755 A2 | 12/2003 |
| JP | 2006-337243 A | 12/2006 |

(Continued)

OTHER PUBLICATIONS

Communication issued on Nov. 10, 2015 by the European Patent Office in related Application No. 15174129.5.

*Primary Examiner* — John A Tweel, Jr.
(74) *Attorney, Agent, or Firm* — Sughrue Mion, PLLC (57) ABSTRACT

An electronic device is configured to check soundness of the electronic device on the basis of device specific information of the electronic device. The electronic device includes a module configured to automatically set and input at least one of the device specific information upon factory shipment of the electronic device and the device specific information upon mounting of the electronic device, into the electronic device.

9 Claims, 11 Drawing Sheets

(56) References Cited

U.S. PATENT DOCUMENTS

2010/0011216 A1    1/2010  Holm-Hansen et al.
2010/0169816 A1    7/2010  Hammer et al.

FOREIGN PATENT DOCUMENTS

| JP | 2007-521470 A | 8/2007 |
| JP | 2010-505121 A | 2/2010 |
| JP | 2011-527806 A | 11/2011 |
| JP | 2012-37696 A | 2/2012 |

* cited by examiner

| ESTIMATED TIME tx | RISK LEVEL |
|---|---|
| 20 YEARS OR LONGER | SAFE |
| 10 YEARS OR LONGER AND UP TO 20 YEARS | ALERT |
| 5 YEARS OR LONGER AND UP TO 10 YEARS | CAUTION |
| ONE YEAR OR LONGER AND UP TO 5 YEARS | DANGER |

Related Art

SOUNDNESS CHECKING FIELD DEVICE

CROSS-REFERENCE TO RELATED APPLICATION

The present application claims priorities from Japanese Patent Application No. 2014-131593 filed on Jun. 26, 2014 and Japanese Patent Application No. 2015-051925 filed on Mar. 16, 2015, the entire content of which is incorporated herein by reference.

BACKGROUND

The present disclosure relates to an electronic device, and more particularly, to management of a variety of specific information which identifies the electronic device.

Figure 10:
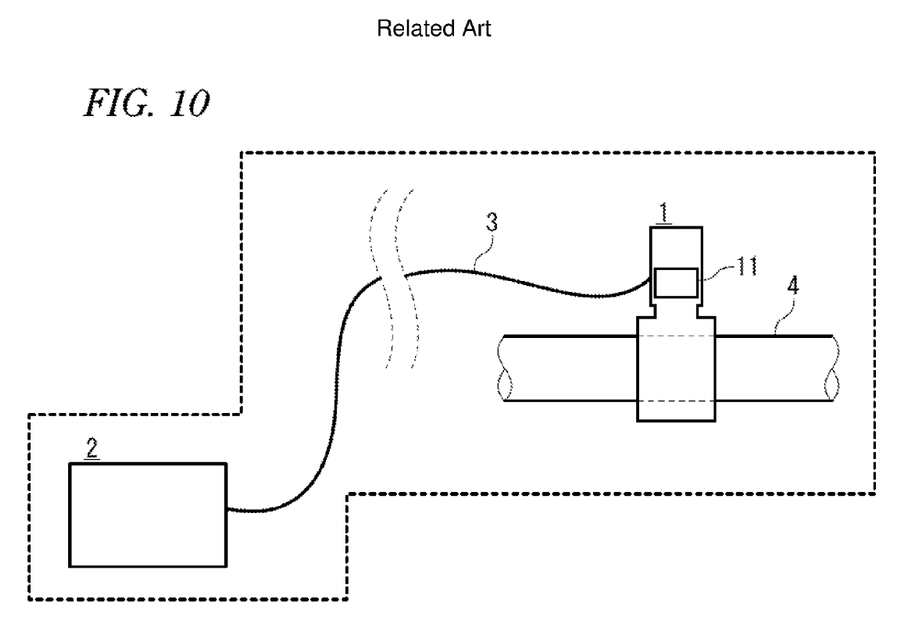
FIG. 10 illustrates a configuration of an example of a field device of the related art.

As a kind of an electronic device, a field device has been known which is configured to measure information such as a flow rate, a temperature and a pressure of a measuring target so as to control a plant, for example. FIG. 10 is a configuration view illustrating an example of the related-art field device. In FIG. 10, the field device includes a sensor 1 and a transmitter 2. The sensor 1 and the transmitter 2 are separately configured, so that the sensor 1 and the transmitter 2 are connected to each other through a signal/excitation cable 3.

The sensor 1 is provided at a pipe 4 in which a fluid flows, and a signal relating to a flow rate is output to the transmitter 2 through the signal/excitation cable 3.

The device specific information of the sensor 1 (which is the information identifying the sensor 1) includes the information, which is set upon factory shipment or upon mounting of the device, for example:

an aperture diameter,
a serial number,
a manufacturing date,
client designation information,
a flow rate correction coefficient,
a zero point-adjusted value,
a coil insulation resistance value,
a coil resistance value,
a signal insulation resistance value and the like.

Here, the zero point-adjusted value is a value obtained by offsetting an unfavorable gentle change or movement of a zero point, which occurs in a relation of an input and an output of the apparatus for a predetermined time period, irrespective of external factors of the device, upon the factory shipment or upon the mounting. A value of the zero point is varied due to problems and the like around an excitation circuit.

The coil insulation resistance value is an insulation resistance value between a coil and a common or between a coil and a signal, which normally has several MΩ. The insulation resistance value is lowered by deterioration of the sensor, for example.

The coil resistance value is a resistance between excitation lines. The coil resistance value is different depending on the aperture diameter or lining, and normally has a resistance value of ±10%. The resistance value is varied depending on coil abnormality temperature changes of fluid/atmosphere, and the like.

The signal insulation resistance value is an insulation resistance value between a coil and a common or between a signal and a signal, which normally has hundreds of M Ω. As described above, the insulation resistance value is lowered by the deterioration of the sensor, for example.

The device specific information is described on a nameplate 11 of the sensor 1, for example. An operator checks the device specific information with eyes and inputs the same to the transmitter 2.

Figure 11:
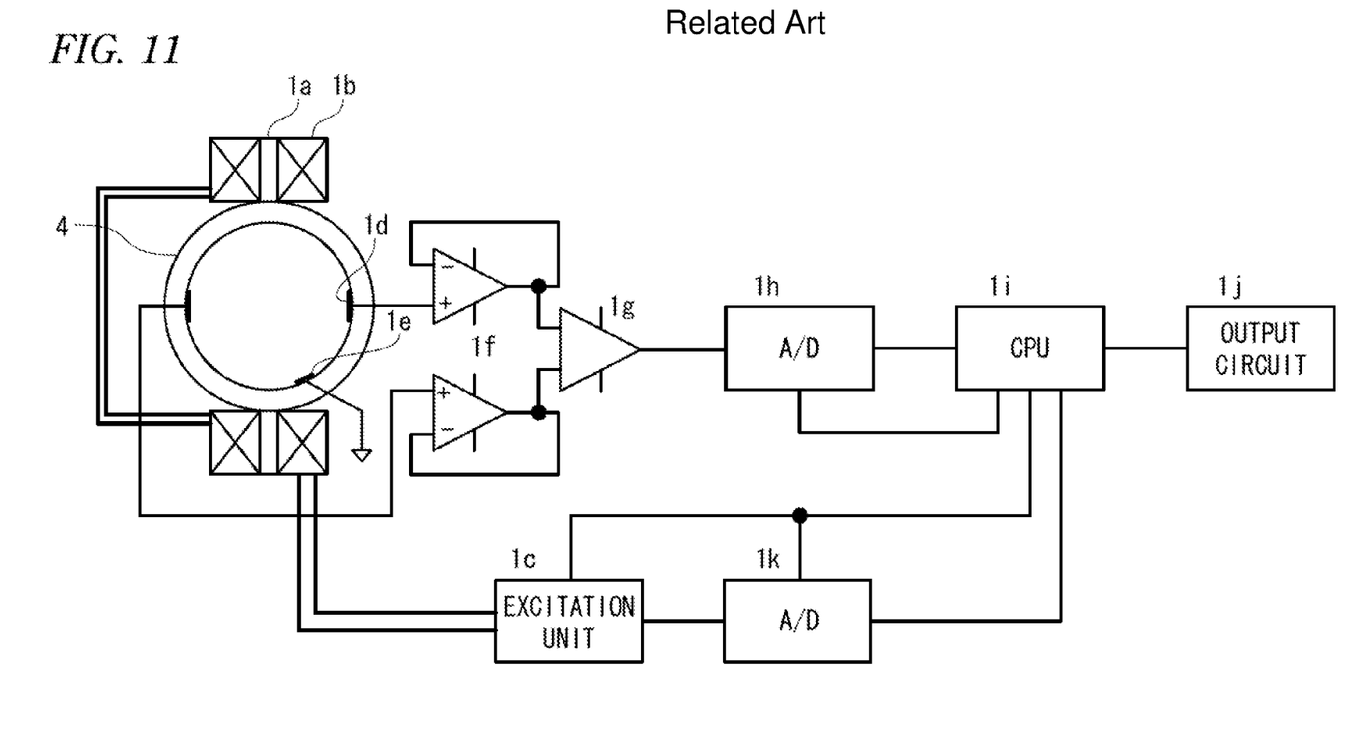
FIG. 11 is a basic configuration view of an electromagnetic flow meter of the related art.

FIG. 11 is a basic configuration view of an electromagnetic flow meter that has been used as a field device. In FIG. 11, the parts common to FIG. 10 are denoted with the same reference numerals. In FIG. 11, a liquid-contacting part of a pipe forming a flow path is made of a material having electrical insulation. An outer periphery of the pipe 4 is provided with yokes 1a facing each other and made of a magnetic material, and coils 1b are wound on the respective yokes 1a. The coils 1b are excited by an excitation unit 1c.

An inner periphery of the pipe 4 is provided with measuring electrodes 1d and an earth electrode 1e. The measuring electrodes 1d are provided to face each other and configured to detect a signal proportional to a magnetic field formed by the yokes 1a and the coils 1b and a flow rate signal.

Signals output from the measuring electrodes 1d are impedance-converted by buffers 1f and are then input to a differential amplifier 1g. The differential amplifier 1g is configured to remove an exogenous noise occurring commonly to the pair of measuring electrodes 1d, to amplify the signal to a desired amplitude level and to input the same to an A/D converter 1h.

The A/D converter 1h is configured to perform A/D conversion so that an analog signal generated at the measuring electrode 1d can be read with a digital value.

A CPU 1i is configured to control a whole circuit, to calculate a flow rate value and an integrated value by using the A/D conversion value of the A/D converter 1h and to perform calculation for diagnosing respective units. Also, the CPU is configured to transfer information of the calculation results to an output circuit 1j, to instruct the output circuit 1j to display the flow rate output value and the diagnosis result, and to control the excitation unit 1c by using an A/D conversion value of an A/D converter 1k.

Here, when the combination of the sensor 1 and the transmitter 2 is fixed, it is preferable to input the device specific information of the sensor 1 to the transmitter 2. Actually, however, the combination of the sensor 1 and the transmitter 2 is not always fixed.

That is, the combination of the sensor 1 and the transmitter 2 may be changed upon the mounting of the field device, upon the repair maintenance, and the like.

When the combination of the sensor 1 and the transmitter 2 is changed, it is necessary to input the changed device specific information of the sensor 1 to the transmitter 2 to which the sensor 1 is actually connected.

Patent Document 1 discloses a technology capable of preventing an incorrect input of a device specific parameter by seeing the same with eyes and effectively updating data of a plurality of electronic devices.

[Patent Document 1] Japanese Patent Application Publication No. 2012-37696A

When inputting the device specific information of the sensor 1 to the transmitter 2, an incorrect input of the device specific information may have a bad influence on a measurement result.

Also, when the sensor 1 is mounted at a place that is out of an operator's reach, it is not possible to easily check the device specific information of the sensor 1, so that the check operation carries a risk.

Also, when it is difficult to check the information described on the nameplate 11 with eyes due to the aging degradation, the high man-hour is caused as to the check operation of the information or the re-calibration is required in some cases.

Also, the necessary information should be re-input whenever the combination of the sensor 1 and the transmitter 2 is changed, so that working man-hour for re-inputting the necessary information is caused.

Further, when the operator performs the input with a hand, it is difficult to easily increase the amount of information to be input, so that the amount of information to be input is limited. Also, a possibility that a human error such as a clerical error and forgetfulness of filling-up will occur increases.

SUMMARY

Exemplary embodiments of the invention provide an electronic device enabling device specific information of the electronic device which is set or measured upon factory shipment, upon mounting of the electronic device at a measurement site, upon repair and upon calibration to be correctly input and stored into the electronic device with ease and without any default, and capable of comparing and analyzing the stored device specific information with a diagnosis result to check soundness of the electronic device.

An electronic device configured to check soundness of the electronic device on the basis of device specific information of the electronic device, the electronic device comprises:

a module configured to automatically set and input at least one of the device specific information upon factory shipment of the electronic device and the device specific information upon mounting of the electronic device, into the electronic device.

Here, the "soundness" includes an indication of the presence or absence of the necessity for maintenance (more specifically, an indication indicating whether or not it is necessary to do the maintenance).

The device specific information may be stored in a memory card detachably mounted to the electronic device.

The device specific information may be provided through the Internet.

The electronic device may be a field device configured to control a plant.

The electronic device may further comprise:

a module configured to output an alarm on the basis of a soundness check result of the electronic device.

The device specific information may be provided through a two-dimensional code.

The device specific information upon mounting of the electronic device may be set and input into the electronic device.

The alarm may be output on the basis of a change amount for each reference measurement value of the device specific information.

According to the present invention, it is possible to check the soundness of the electronic device precisely and correctly.

DETAILED DESCRIPTION

Figure 1:
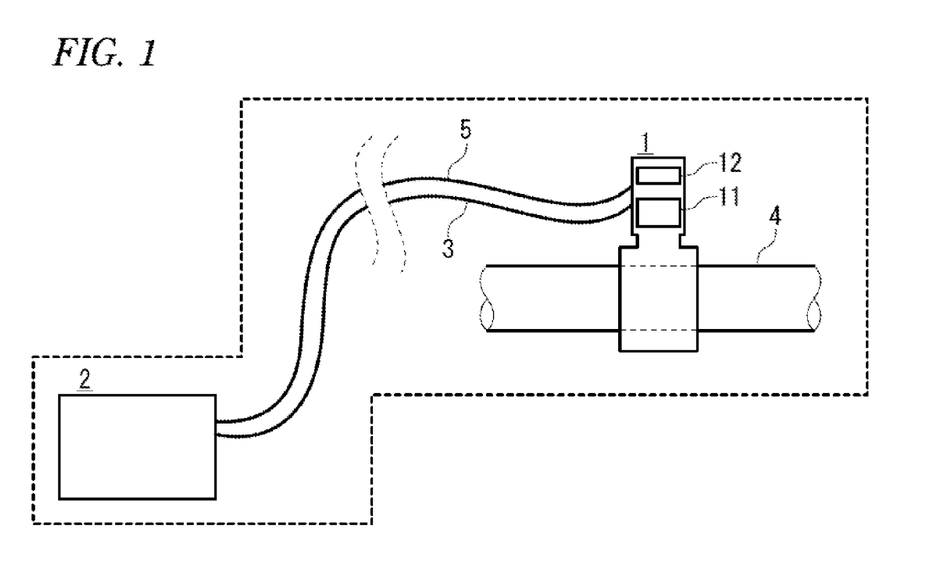
FIG. 1 is a configuration view illustrating an exemplary embodiment of the present invention.

Hereinafter, the present invention will be described in detail with reference to the drawings. FIG. 1 is a configuration view illustrating an exemplary embodiment of the present invention. In FIG. 1, the parts common to FIG. 10 are denoted with the same reference numerals.

In FIG. 1, a sensor 1 is provided with an ID substrate 12, and the ID substrate 12 is connected to a transmitter 2 through a communication/power supply cable 5 for an ID substrate.

Figure 2:
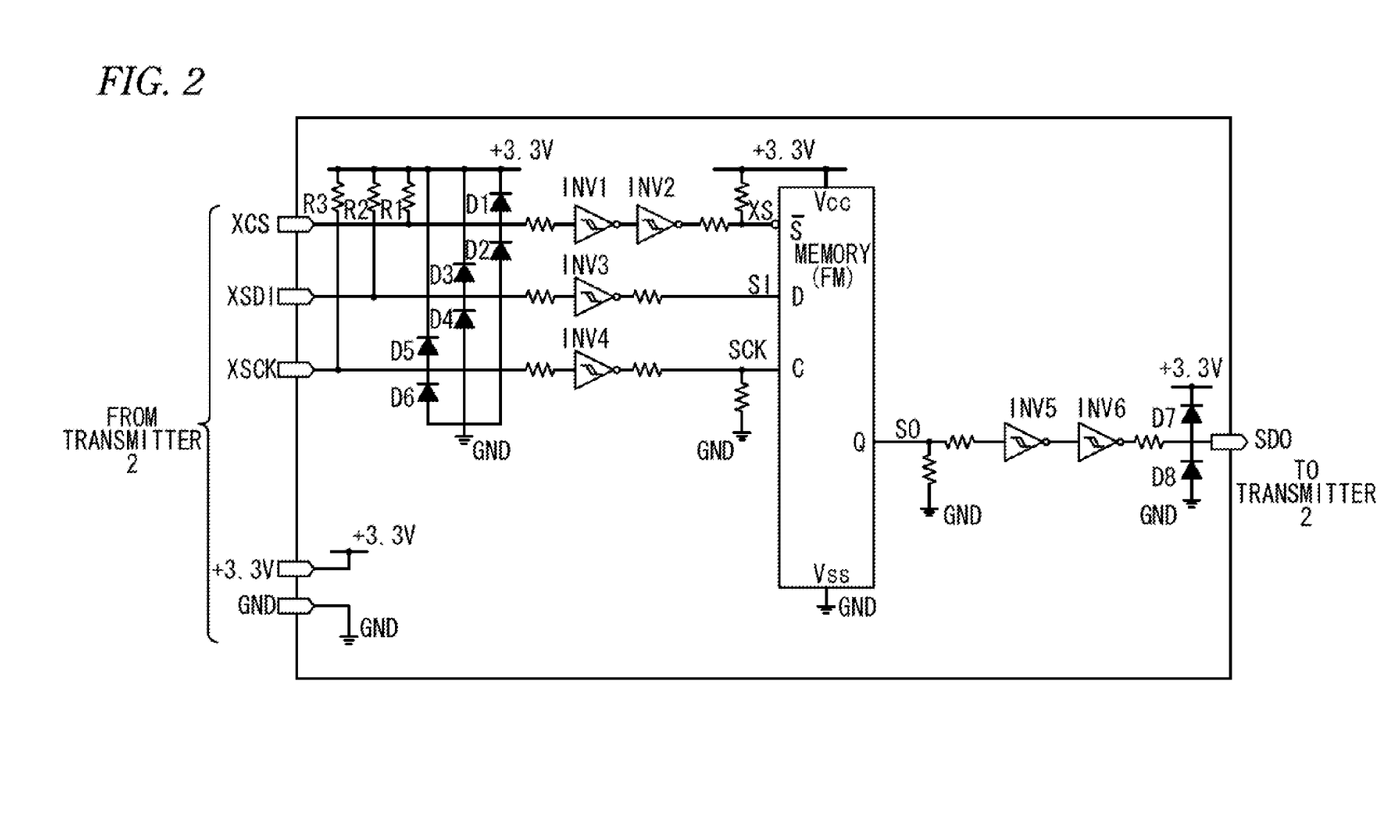
FIG. 2 is a block diagram showing a specific example of a data storage memory unit mounted on an ID substrate 12.

FIG. 2 is a block diagram showing a specific example of a data storage memory unit mounted on the ID substrate 12. Data communication is performed between the sensor 1 and the transmitter 2 in a serial interface manner of using a BUS line. The power is fed from the transmitter 2. Meanwhile, in FIG. 2, each signal is denoted with a symbol 'X' at its head so as to identify a negative logical signal.

The sensor 1 is input with a chip select signal XCS, serial data XSI and a serial clock XSCLK from the transmitter 2. Serial data SDO is output to the transmitter 2.

An input/output interface unit of the ID substrate 12 is configured to perform a pull-up process with respect to the power through resistances R1 to R3, as a countermeasure of IC input open when the power feeding is off. Also, clamp circuits consisting of series circuits of diodes D1 and D2, diodes D3 and D4, diodes D5 and D6, and diodes D7 and D8 are connected between a power supply and a ground GND, as a countermeasure of electrostatic breakdown. In the meantime, the power is fed from the transmitter 2.

As the memory, a flash memory FM that is configured to read and write data in a serial peripheral interface module (SPI) manner is used, for example.

Since an input signal interface with the transmitter 2 is configured to perform a signal input with a negative logic, inverters INV1 to INV4 are connected to logically invert a signal before a signal input to the memory FM. At this time, since the chip select signal XCS is a negative logical signal at the memory-side, too, it is again logically inverted. In the meantime, as the inverters INV1 to INV4, schmitt trigger inverters are used to shape a gentle ascent or descent of a waveform pulse, which is caused due to external factors such as a cable.

The data, which is input and stored in the memory FM, includes the data on the device specific information of the sensor 1, for example, a zero-adjusted value, a coil insulation resistance value, a coil resistance value, a signal insulation resistance and the like, which are measured upon the factory shipment, in addition to an aperture diameter, a serial number, a manufacturing date, client designation information and a flow rate correction coefficient, and is directly written to a memory area set on a resistor of the transmitter 2-side.

The serial data SDO is output to the transmitter 2, as a positive logical signal through inverters INV5, INV6.

The device specific information of the sensor 1 is once input and stored in the transmitter 2 upon the factory shipment and is then transferred through the communication/power supply cable 5 and stored in the memory FM mounted on the ID substrate 12 of the sensor 1.

Figure 3A:
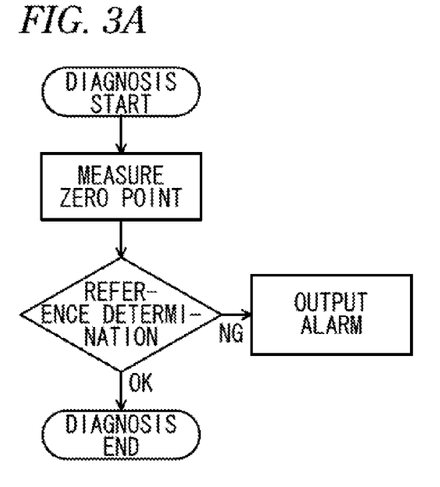
FIGS. 3A to 3D are flowcharts showing a flow of a diagnosis based on device specific information transferred and stored in a memory FM.
Figure 3B:
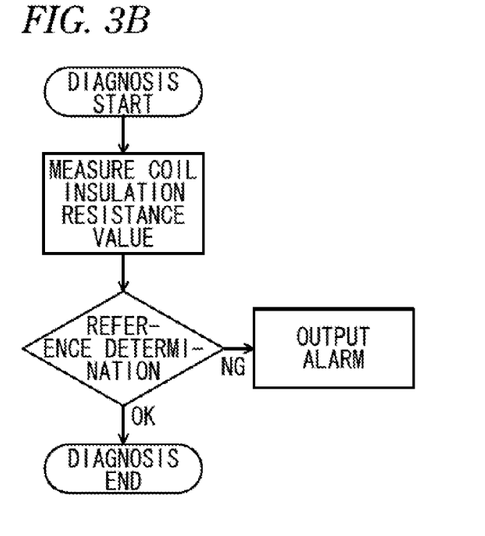
Figure 3C:
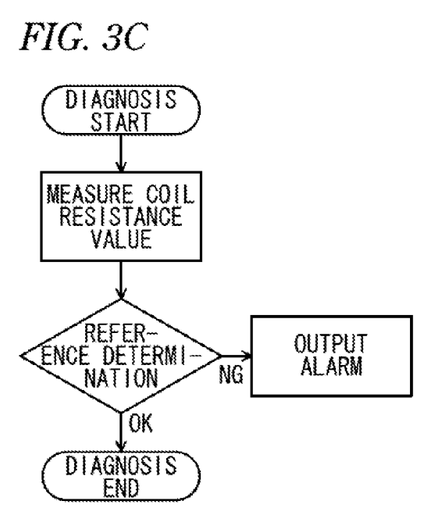
Figure 3D:
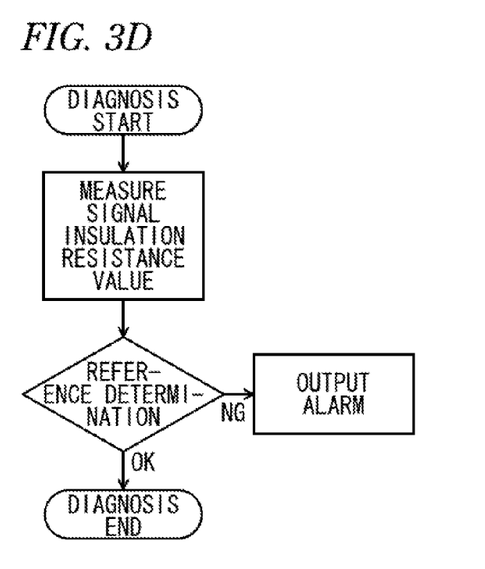

FIGS. 3A to 3D are flowcharts showing a flow of a diagnosis based on the device specific information stored in the memory FM, in which FIG. 3A shows diagnosis of the zero point, FIG. 3B shows diagnosis of the coil insulation resistance value, FIG. 3C shows diagnosis of the coil resistance value, and FIG. 3D shows diagnosis of the signal insulation resistance value. The transmitter 2 performs the diagnosis shown in FIGS. 3A to 3D with respect the sensor 1 by using the information stored in the memory FM and then informs an operator of an alarm in accordance with the result of the reference determination. In any case of FIGS. 3A to 3D, regarding each measuring result, a predetermined threshold value, which becomes a basis for decision to pass or fail, is stepwise provided in advance upon the factory shipment. When a measuring result does not satisfy each threshold value condition, the transmitter 2 outputs the alarm to alert the operator to the preventive maintenance.

Also, change amounts for reference measurement values of the device specific information upon the factory shipment of a device or upon the mounting at a measurement site may be obtained and time series-analyzed to estimate time necessary to reach the predetermined threshold value and an alarm may be output depending on each risk level.

Figure 4:
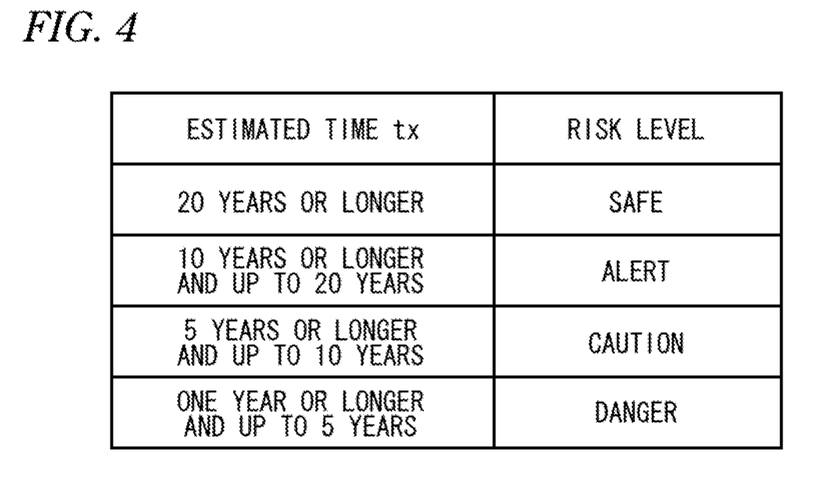
FIG. 4 shows a specific example of a relation between estimated time and a risk level.

FIG. 4 shows a specific example of a relation between the estimated time and the risk level. In the example of FIG. 4, a correspondence relation between the estimated time necessary to reach the predetermined threshold value and the risk level is set as follows.

| estimated time | risk level |
| --- | --- |
| 20 years or longer | safe |
| 10 years or longer and up to 20 years | alert |
| 5 years or longer and up to 10 years | caution |
| one year or longer and up to 5 years | danger |

Figure 5A:
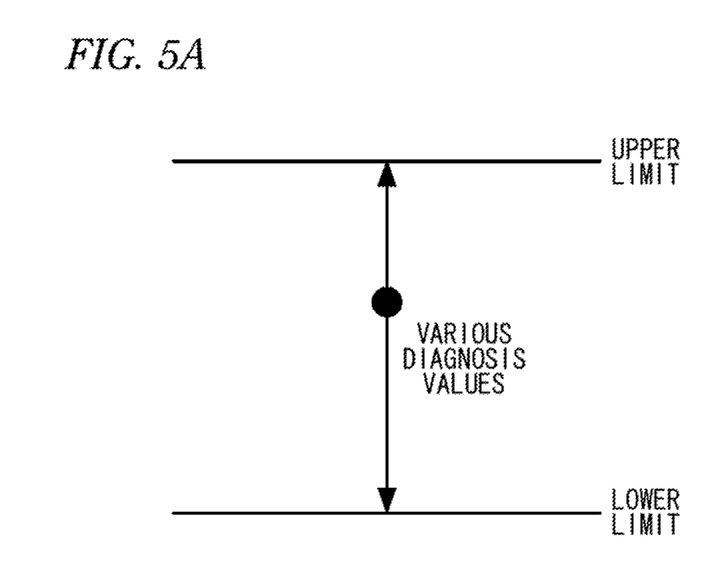
FIGS. 5A and 5B illustrate a diagnosis result and a threshold value.
Figure 5B:
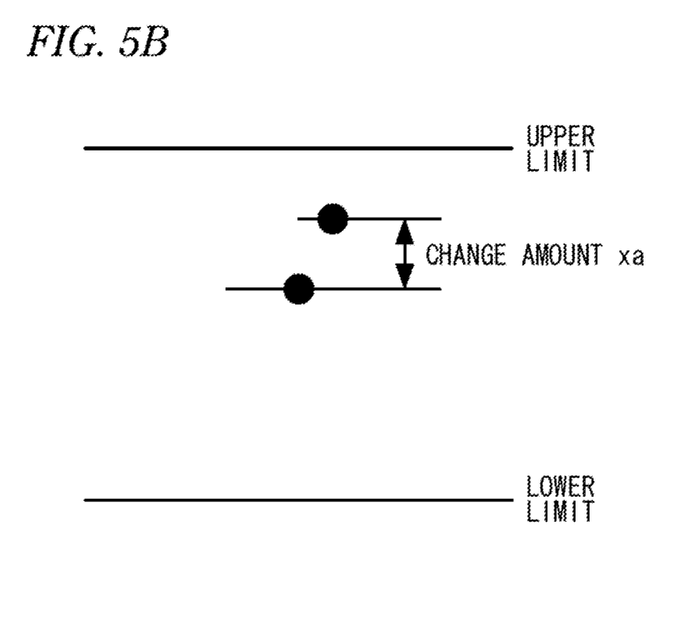

FIG. 5 illustrates the diagnosis results and threshold values, in which FIG. 5A shows the related art, and FIG. 5B shows an exemplary embodiment of the present invention. According to the diagnosis result of the related art, since an alarm is not output until it reaches the threshold value, as shown in FIG. 5A, it is not possible to read a sign of the aging degradation and the like.

Also, the threshold value of the related art is determined by a maker-recommended value (default) or user setting value. However, when the threshold value is not an appropriate value, an alarm may be frequently output, or an alarm may not be output even though the alarm should be output.

In contrast, according to the exemplary embodiment of the present invention, as shown in FIG. 5B, the determination is made on the basis of a change amount xa for each reference measurement value of the device specific information upon the factory shipment of the device or upon the mounting at the measurement site.

Figure 6:
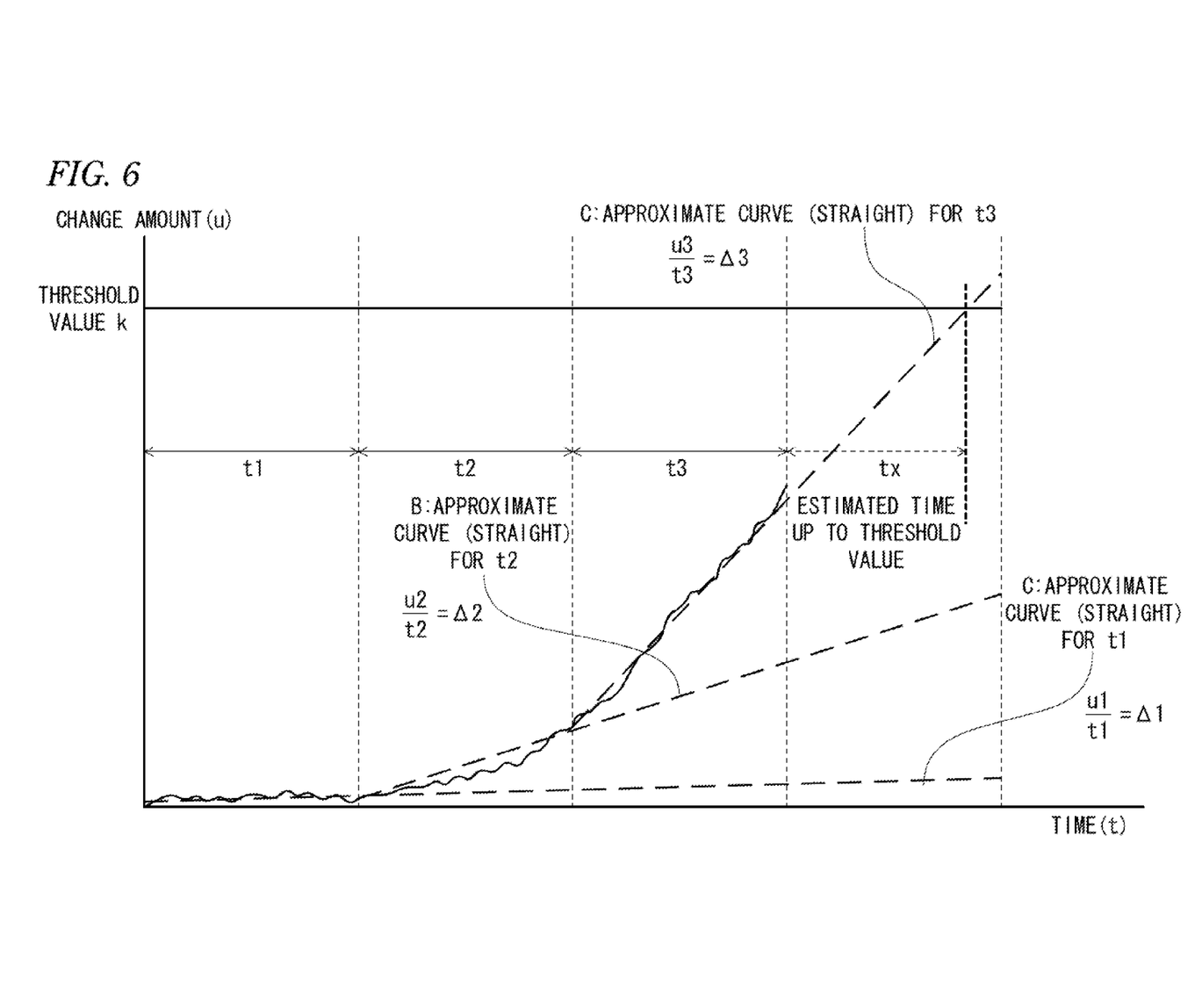
FIG. 6 illustrates an example of a characteristic change curve.

FIG. 6 illustrates an example of a characteristic change curve. Regarding a determination criterion, the estimated time tx up to the threshold value k shown in FIG. 6, for example, is managed on the basis of the risk level of FIG. 4.

The estimated time tx is obtained on the basis of a gradient of an approximate line obtained by approximating a change amount from the last data, as indicated in an equation 1. At this time, if the change amount is approximated from all the data, the precision is lowered when the change amount is complicated. Therefore, in the example of FIG. 6, the estimate time tx is obtained by calculating the gradient of the approximate line on the basis of the change amount in a section t3, so that the precision is improved. In the meantime, a time period for approximation may be arbitrarily changed.

(Equation 1)

$$\text{estimated time } tx = (\text{threshold value } k - \text{current change amount})/\text{gradient } \Delta \text{of the last approximate line} \quad (1)$$

As the parameter of the transmitter, the estimated time up to the threshold value may be displayed, in addition to the risk level.

Also, FIG. 6 shows the example where the approximate line is straight. However, the approximate line is not limited to the straight line and may be a log, a polynomial, a power, and the like.

By the above, it is possible to input the device specific information of the sensor 1 into the transmitter 2 easily and correctly with no fail. Also, it is possible to carry out the diagnosis for checking the soundness of the sensor 1 by using the device specific information of the sensor 1.

By checking the soundness on the basis of the change amount for each reference measurement value of the device specific information, it is possible to perceive and check the sign of the aging degradation of the sensor 1 precisely and correctly and to systematically perform the maintenance of the sensor 1.

Also, it is possible to narrow the factors of the degradation of the sensor 1 on the basis of the magnitude of the change amount for each reference measurement value of the device specific information, so that it is possible to easily take a measure upon the maintenance.

When the field device such as the sensor is used, the soundness may be lost over time due to a temperature, a pressure, a fluid, slurry, vibration, shock and the like. When the soundness is lost, an error of the measuring result is increased.

Regarding the above problem, according to the related art, the cause of the error is not examined until the error is exhibited. However, according to the present invention, the values upon the factory shipment or upon the mounting are set as the reference values (reference measurement value), and the current measured values of the elements are compared with the set reference values (reference measurement value) to obtain the magnitudes of the change amounts for the respective reference measurement values. Therefore, it is possible to recognize the soundness of the sensor at the present moment.

Figure 7:
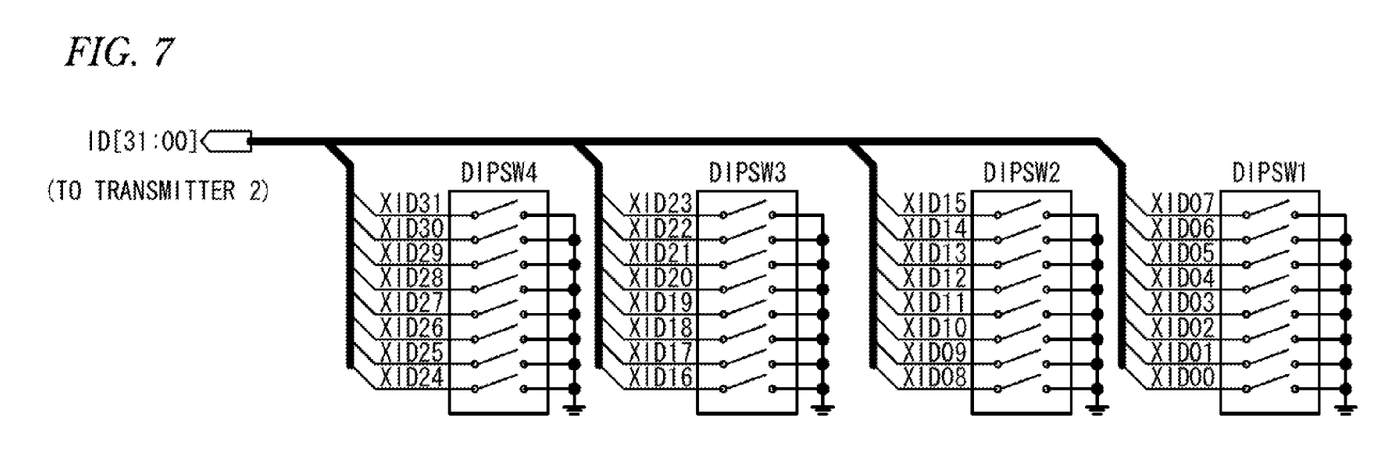
FIG. 7 illustrates a configuration of another exemplary embodiment of the present invention.

FIG. 7 illustrates a configuration of another exemplary embodiment of the present invention. In the exemplary embodiment of FIG. 2, the device specific information is transferred to the transmitter 2 by using the memory FM. However, in the exemplary embodiment of FIG. 7, DIP switches are used. FIG. 7 shows an example where the information of 32 bits is transferred to the transmitter 2.

In FIG. 7, fixed contacts of respective DIP switches DIPSW1 to DIPSW4 are connected to the ground GND, and moving contacts of the switches corresponding to respective bits are closed to set ON states, so that a path is shorted to the ground GND and data of the ON bit is set to an L level (negative logic). Each bit signal of the ID is pulled up to an H level at the input terminal of the transmitter 2 by the resistance. When the sensor-side is at an OPEN state, the bit signal is set to the H level. The configuration and the diagnosis processing after the setting are substantially the same as FIG. 2.

Figure 8:
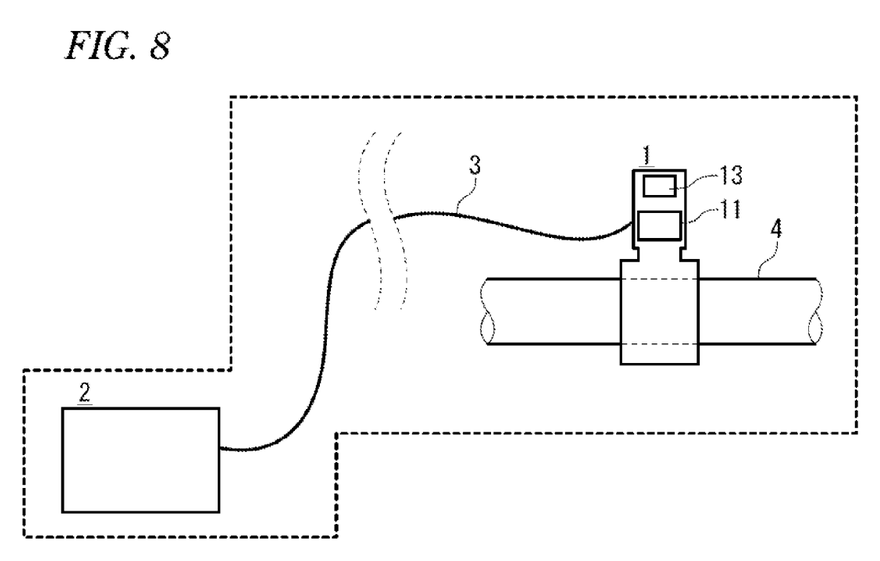
FIG. 8 illustrates a configuration of another exemplary embodiment of the present invention.

FIG. 8 illustrates a configuration of another exemplary embodiment of the present invention. In FIG. 8, a two-dimensional code 13 such as a QR code (registered trademark) is adhered to the sensor 1. The QR code of a standard size may have the information of 2953 bytes if it is the binary and the information of 4296 letters if it is the alphanumeric character. That is, it is possible to record a larger amount of the information in the QR code, as compared to the information amount described by the character symbols on the nameplate according to the related art.

The device specific information of the sensor 1 is converted and recorded into the two-dimensional code 13, and the two-dimensional code information is read out and is then input to the transmitter 2 by a dedicated reader (not shown) upon the mounting of the field device. As an input method to the transmitter 2, the dedicated communication such as infrared, the analog signal communication by a 4-20 mA current loop, which is widely used in the industrial field, the hybrid communication such as highway addressable remote transducer (HART) in which a digital signal is overlapped with an analog signal, the digital communication such as a field bus may be used.

In the meantime, the two-dimensional code 13 may be adhered or printed on a main nameplate provided at the outside of the sensor 1, like the related art, or may be adhered to an inside of the sensor 1 so as to prevent an visual perception error caused due to the aging degradation. The diagnosis processing after the setting is substantially the same as FIG. 2.

Figure 9:
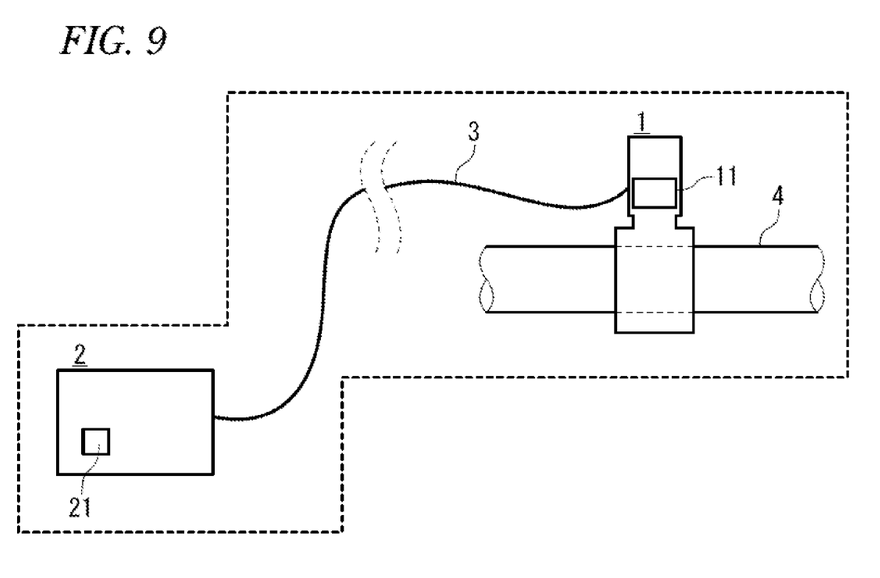
FIG. 9 illustrates a configuration of another exemplary embodiment of the present invention.

FIG. 9 illustrates a configuration of another exemplary embodiment of the present invention. In FIG. 9, the transmitter 2 is provided with a memory card 21. The memory card 21 is input with the device specific information of the sensor 1 upon the factory shipment and is shipped in sets, as an accessory of the sensor 1.

In the meantime, the memory card 21 may be lost. Therefore, the data upon the factory shipment may be managed by a manufacturer, and the device specific information may be again provided in correspondence to the inquiry or may be published under security management on the Internet so that a user can directly refer to. Regarding the reference of the device specific information, the device specific information is made to be traced from the device serial number described on the main nameplate, for example.

Also, in the above exemplary embodiment, the electromagnetic flow meter that is used for a plant control system has been exemplified as the electronic device. However, the present invention is not limited to the electromagnetic flow meter and can be applied to a variety of electronic devices of which the soundness should be checked, such as a household electrical appliance, an electronic business machine, an electronic measuring device, and the like.

Further, the device specific information of the electronic device may be provided as a two-dimensional barcode such as the QR code (registered trademark).

As described above, according to the present invention, it is possible to correctly input and store the device specific information of the electronic device into the electronic device with ease and without fail upon the factory shipment, upon the mounting at the measurement site, upon the repair, upon the correction and the like.

Also, it is possible to correctly check the soundness of the electronic device with precision by analyzing the stored device specific information and the change amounts for the reference measurement values of the device specific information. Therefore, the present invention is applicable to the field device such as the electronic flow meter, too, for example.

What is claimed is:

1. A field device comprising:
a sensor including a non-volatile memory; and
a transmitter configured to perform a communication with the sensor, the transmitter including a memory area in which a device specific information is stored, and a module configured to transfer the device specific information stored in the memory area to the non-volatile memory of the sensor,
wherein the device specific information is information identifying the sensor.

2. The field device according to claim 1, wherein the device specific information is stored in a memory card detachably mounted to the field device.

3. The field device according to claim 1, wherein the device specific information is provided through the Internet.

4. The field device according to claim 1, wherein the field device configured to control a plant.

5. The field device according to claim 1, wherein the sensor performs a check of a soundness based on the device specific information transferred to the non-volatile memory.

6. The field device according to claim 5,
wherein the sensor performs a check of the soundness based on a change amount of a value obtained by measurement with respect to the device specific information transferred to the non-volatile memory.

7. The field device according to claim 1, wherein the device specific information is provided through a two-dimensional code.

8. The field device according to claim 6, wherein the sensor outputs an alarm to the transmitter when a soundness check result does not satisfy a certain condition.

9. The field device according to claim 1, wherein the device specific information includes at least one of an aperture diameter, a client designation information, a flow rate correction coefficient, a zero-adjusted value, a coil insulation resistance value, a coil resistance value, and a signal insulation resistance.

\* \* \* \* \*